United States Patent [19]

Hartman et al.

[11] Patent Number: 5,476,712
[45] Date of Patent: Dec. 19, 1995

[54] FLEXOGRAPHIC PLATE MOUNTING TAPE

[75] Inventors: William G. Hartman, Seven Hills; Thomas C. Epple, Madison, both of Ohio; Roger H. Mann, Corona del Mar; Edward I. Sun, Alhambra, both of Calif.

[73] Assignee: Avery Dennison Corporation, Pasadena, Calif.

[21] Appl. No.: 251,753

[22] Filed: May 31, 1994

[51] Int. Cl.⁶ .................................................. C09J 7/02
[52] U.S. Cl. ...................... 428/317.3; 428/317.7; 428/319.9; 428/354; 428/355
[58] Field of Search ................ 428/317.3, 317.7, 428/317.1, 315.9, 319.7, 319.9, 354, 343, 355; 427/208; 101/401.1

[56] References Cited

U.S. PATENT DOCUMENTS

| | | | |
|---|---|---|---|
| 3,262,827 | 7/1966 | Kallander et al. | 156/230 |
| 3,503,568 | 3/1970 | Galley | 242/74 |
| 3,616,178 | 10/1971 | Gurin | 161/167 |
| 3,847,647 | 11/1974 | Bahlo | 117/38 |
| 3,983,287 | 9/1976 | Goosssen et al. | 428/241 |
| 3,993,826 | 11/1976 | Butler et al. | 428/220 |
| 3,993,833 | 11/1976 | Esmay | 428/317.3 |
| 4,024,312 | 5/1977 | Korpman | 428/343 |
| 4,169,184 | 9/1979 | Pufahl | 428/311 |
| 4,389,444 | 6/1983 | Korpman | 428/137 |
| 4,537,129 | 8/1985 | Heinemann et al. | 101/415.1 |
| 4,554,193 | 11/1985 | Erickson | 428/317.3 X |
| 4,574,697 | 3/1986 | Feeley | 101/401.1 |
| 5,085,655 | 2/1992 | Mann et al. | 604/389 |
| 5,325,776 | 7/1994 | Rather, Sr. et al. | 428/315.9 X |
| 5,334,447 | 8/1994 | Kitamura et al. | 428/317.3 |

FOREIGN PATENT DOCUMENTS

| | | |
|---|---|---|
| 0206760 | 12/1986 | European Pat. Off. . |
| 1533431 | 11/1978 | United Kingdom . |

*Primary Examiner*—Jenna L. Davis
*Attorney, Agent, or Firm*—Pearne, Gordon, McCoy & Granger

[57] ABSTRACT

A double sided tape for detachably mounting a flexible printing plate to a flexographic printing press cylinder includes pressure-sensitive adhesive layers on opposed sides of a coextruded multilayer carrier having a core formed of a thermoplastic elastomer containing a uniform distribution of voids and one or more skin layers formed of film-forming thermoplastic polymer. The cellular thermoplastic elastomer is constructed to accommodate compressibility loads imposed during printing and to resist shear and tensile loads imposed during tape removal.

28 Claims, 1 Drawing Sheet

FLEXOGRAPHIC PLATE MOUNTING TAPE

BACKGROUND OF THE INVENTION AND RELATED ART

The present invention relates to adhesive tapes and to methods of making and using the same. More particularly, the present invention contemplates adhesive tapes useful to detachably join elements together, especially at least one flexible element. The tapes are especially useful in printing applications for detachably mounting printing plates in printing presses during printing operations.

In flexographic printing, flexible printing plates carrying the image to be printed are mounted to printing press cylinders for resilient printing contact with substrates to be printed. The printing plates are formed of polymeric materials such as rubber or photopolymer, and they are removably mounted to the steel print cylinders by double sided tape sometimes referred to as "stickyback." In printing applications for both labelling and packaging, the printing plates are reused and several different plates may be used in daily production runs of different products.

The resilient contact between the printing plate and substrate to be printed is provided at least in part and/or significantly affected by the compressibility or resiliency of the tape. It is known in the art to use a double sided tape having a carrier containing a flexible foam layer and opposed layers of pressure sensitive-adhesive. Such double coated foam carrier tapes generally provide sufficient compressibility to assure printing of relatively fine or small indicia. However, the foam carrier tapes tend to be too compressible for printing of relatively large indicia (e.g. indicia having border dimensions of one-eighth inch or more) and cause excessive ink flow on the substrate. For printing such large indicia, the prior art teaches the use of a less compressible tape having a carrier containing a thermoplastic resin layer such as a polyvinylchloride film layer. Such vinyl carrier tapes tend to provide satisfactory printing of large indicia, but they do not provide the sharpness and fine detail needed in relatively small indicia. Consequently, printers have tended to inventory and use both foam and vinyl carrier tapes in order to attain satisfactory print quality for the full size range of print indicia.

In order to obtain uniform print quality, it is necessary that the tape be of uniform caliper or thickness. Variations in tape thickness tend to cause print color or intensity differences. Foam carrier tapes have tended to have unacceptable thickness variations, for example, a 20 mil thick tape may range from 16 to 24 mils in thickness. Such thickness variations yield undesirable print color or intensity differences as noted above. In extreme cases, thickness variations may prevent proper end-to-end abutting alignment of the printing plate around the print cylinder. For example, the two abutting tape edges may be at sufficiently different heights to cause a detectable printing difference across the butt joint.

The ease of tape removability from the print cylinder is important to efficient use of the tape and to maintaining good printing production rates. During installation of the printing plate, it may be necessary to remove and reposition the tape relative to the print cylinder. If the tape tears during its removal for repositioning, the tape is wasted and discarded without printing use. Following the printing process, the tape is removed from the print cylinder in preparation for the mounting of a different printing plate. In both cases, the tape should strip cleanly and separate from the print cylinder by hand manipulation without tearing or rupturing internal layers so as to leave behind irregular pieces of tape residue such as adhesive and/or tape fragments. Preferably, the tape pieces should strip from the cylinder as an integral piece without leaving behind tape residue and thereby provide "one piece removability". Prior foam carrier tape constructions tended to shear or tear in the foam layer during removal from the cylinder and required additional time for tape removal and clean-up processing.

G.B. 1,533,431 discloses a laminated double sided tape for mounting flexographic letterpress printing plates including an elastomeric layer having rigid-walled frangible bubbles, a dimensionally stable reinforcing layer and opposed outer adhesive layers. The frangible bubbles are broken with pressure and the wall fragments are retained in the resulting voids.

A double sided tape for mounting a flexible printing plate to a drum is disclosed in U.S. Pat. No. 4,574,697. The tape includes a polyurethane flexible foam applied to a polyethylene terephthalate base film and outer adhesive layers. The tape is indicated to be removable from the printing plate and drum as an integral sheet, and to be an improvement over vinyl carrier tapes that lack memory and do not retain gauge during long printing runs. A similarly constructed tape having a polyethylene foam layer selected to reduce vibrations is disclosed in European Patent Application 0 206 760.

U.S. Pat. No. 3,983,287 discloses a printing blanket comprising a laminate including a compressible interior support layer of incompressible elastomer having dispersed and bonded therein frangible rigid-walled bubbles that have been broken to impart compressibility.

SUMMARY OF THE INVENTION

As indicated above, the adhesive tape of the present invention may be used to detachably secure elements together. The tape includes a carrier and adhesive layers on opposite faces or sides thereof. The composition of the carrier layer is selected to achieve desired tape application characteristics as well as desirable manufacturing or processing benefits. The tape is especially useful in the mounting of flexographic printing plates.

The tape carriers are formed of polymeric materials that provide desired compressibility and tear resistance characteristics for flexographic printing applications while at the same time enabling economical tape manufacturing techniques. More particularly, the carrier comprises a multilayer coextrudate having an internal cellular structure. The carrier is formed by the coextrusion of a plurality of resin charges, at least one of the charges containing a blowing agent to provide the cellular structure.

In preferred constructions, the carrier comprises a closed cell core or central layer and at least one skin or outer layer. The core layer comprises a thermoplastic elastomer matrix containing a distribution of voids provided by the blowing agent. The skin layer comprises a continuous non-cellular, film-forming thermoplastic polymer layer that is preferably substantially free of internal voids as well as voids along the interface with the core.

The blowing agent preferably comprises a "so-called" physical blowing agent in that it is thermally blown or expanded upon heating to an elevated temperature, but it does not chemically react to form the cellular structure. (A chemical blowing agent includes a chemical reaction to generate a gas that forms cells or voids in the polymer matrix.) The blowing agent expansion temperature may be matched with the extrusion temperature so that the blowing agent does not materially affect the extrusion processing of the core charge. In this manner, coextrusion processing may be used to simultaneously form the core in a single economical process operation without significant problems due to the presence of the blowing agent.

In the illustrated embodiment, the tape includes opposed layers of adhesive and at least one skin layer intermediate the carrier and one of the adhesive layers. The skin or skins separate the adhesive from the carrier layer, and restrict migration of adhesive constituents as well as the flow of printing ink solvents which may adversely affect the initial or aged tape properties.

The core provides the majority of the tape strength and compressibility properties. The skin smooths the adjacent outer core face which may be roughened excessively by the expansion of the blowing agent. The smoothing of the core face is by a leveling of the roughness resulting from the blowing process. In this manner, the skin provides the carrier with a smooth face.

Thermoplastic elastomers having a cellular structure in accordance with the invention are believed to enable a tape construction of printing compressibility characteristics suitable for the printing of both small and large indicia.

The cellular thermoplastic elastomer core layers of the invention also provide tapes of an internal tear strength or cohesive strength sufficient to enable tape repositionability and removability from a plate holder mounting surface such as a printing cylinder. The tape may be manually stripped from its installed position around the cylinder without layer tearing or tape residue adhering to the cylinder to enable repositioning of the tape or removal of the plate following completion of the printing process. The tape cleanly separates by manually pulling the tape from an end or edge thereof to provide "one piece removability." The tape also strips cleanly from the printing plate if it is necessary to reposition the plate during its installation.

The tape carrier outer layer is preferably coextruded in order to enhance the integrity of the multilayer carrier composite as noted above and to gain production economies over solvent coating techniques, for example. The cellular thermoplastic elastomer and the skin layers are therefore also selected and/or formulated to provide melt and rheological properties enabling coextrusion. The tape including the adhesive layers may also be coextruded with selection and/or formulation of suitable layer properties.

BRIEF DESCRIPTION OF THE DRAWINGS

In the drawings, all of which are highly diagrammatic and do not show the various elements to scale.

DETAILED DESCRIPTION OF THE DRAWINGS

Figure 1:
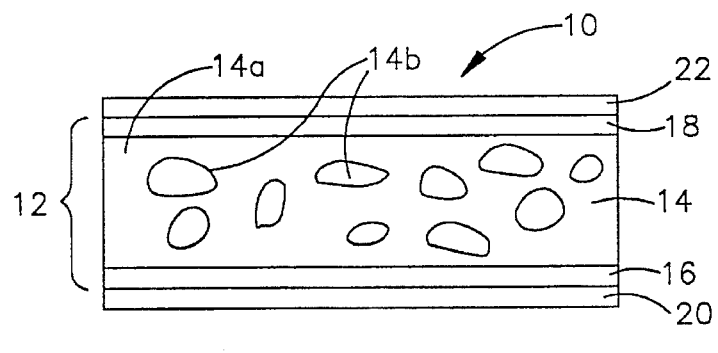
FIG. 1 is a cross-sectional view showing a tape having a multilayer carrier including a core and opposed skin layers which are each joined to an outer adhesive layer in accordance with the invention.
Figure 1A:
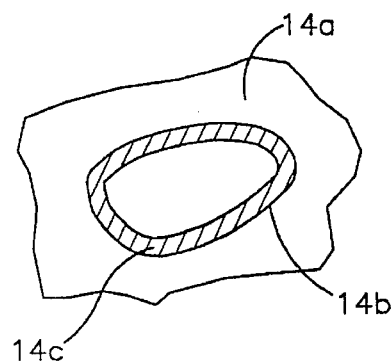
FIG. 1A is a fragmentary view on an enlarged scale showing a void or cell and a surrounding portion of the polymer matrix.

Referring to FIG. 1, a tape 10 includes a multilayer carrier 12 having a core or central layer 14 and opposed skin layers 16 and 18. Adhesive layers 20 and 22 are joined to the skins 16 and 18 at the outer sides of the tape 10. Each of the layers of the carrier 12 is integrally bonded to its adjacent neighbor layer by heat bonding or welding during their manufacture.

The core 14 has a cellular construction provided by a matrix 14a of elastomeric material and voids or cells 14b. The voids 14b are preferably substantially uniformly distributed throughout the matrix 14a and comprise expanded, gas-containing microspheres 14c that form a closed cell structure. Preferably, the voids 14b do not extend into the skin layers 16 or 18.

In a preferred embodiment, the voids 14b are formed by expanded thermoplastic shell microspheres containing the vapor phase of an organic liquid. The liquid is evaporated and the volume of the microsphere is substantially increased during a thermal blowing and expanding step. Typical expansions may be in the order of 60 times the initial volume of the liquid containing microsphere. The expansion of the microsphere is dependent on the temperature and time of expansion during the blowing and expanding step.

The shape of the expanded microsphere and void is not critical, but experience to date indicates a generally spherical shape is attained in thermoplastic block copolymers. Similarly, the size range of the expanded microspheres is not critical provided the microspheres are contained within the thickness of the core 14. In a typical core layer sample having a thickness of about 20 mils, the expanded microspheres may range in size from about 11 microns to about 54 microns. The average microsphere size in such sample may be about 27.8 ±5.9 microns at a 95% confidence level.

The void volume of the core 14 may be altered by increasing the concentration of blowing agent in the core layer charge and/or increasing the temperature and duration of the blowing and expanding step. In coextrusion processing, the processing temperature is primarily determined by the rheology of the polymers, and the void volume of the core 14 tends to be varied by changing the concentration of the blowing agent added to the core charge. Typical blowing agent concentrations may range from about 1% to 4% by weight based on the weight of the core charge by using a single screw extruder. It is believed that the blowing agent concentrations may range from 1% to 6% by use of a twin screw extruder.

The blowing agents of interest herein should have relatively high blowing and expanding temperatures to accommodate the extrusion temperatures of the polymer materials of interest herein. Experience to date indicates that commercially available blowing agents may be used satisfactorily with extrusion temperatures in the range of from about 150° to about 180° C., and more preferably, from about 155° to about 170° C. Higher coextrusion temperatures may cause premature blowing or expansion of the blowing agent and/or rupture of microspheres and blow holes in the skins so as to result in an inferior product not having the required compressibility. Lower temperatures may reduce the processability of the thermoplastic materials.

The void volume of the carrier 12 is reasonably approximated as the ratio of the difference between the measured density of the carrier 12 including the skins 16 and 18 and the calculated density of the carrier based on the densities and thicknesses of the polymer components. The void volume percentage may range from about 10% to about 50%. A typical value is about 35%.

The core 14 is formed of selected thermoplastic elastomers. The thermoplastic elastomers of interest herein include any block copolymer having or containing the triblock structure A-B-A where A represents a block which is non-rubbery or glassy or crystalline at service or room temperature but fluid at higher temperatures, and B represents a block which is rubbery or elastomeric at service or room temperature. In addition to the A-B-A triblock structure, other possible structures include radial structures (A-B)$_x$A, where x is greater than 1, diblock structures A-B and combinations of these structures. The elastomer may comprise from about 60 to 95% rubbery segments by weight and from about 5 to about 40% non-rubbery segments by weight.

The block copolymers of the elastomer form a two-phase system with the rubbery and non-rubbery segments being thermodynamically incompatible at service or room temperature. In accordance with the "domain theory," the non-rubbery segments tend to agglomerate and form hard domains which act as strong, multifunctional junction points within the elastomer matrix so that the polymer molecules behave as if joined in a cross-linked network. This polymeric arrangement is referred to as "physical cross-links."

The physical cross-links of the thermoplastic elastomer provide it with properties similar to those of a vulcanized rubber at room temperature. However, heating causes the domains to soften and the network to lose its strength so that the polymer may flow with application of shear force. Upon removal of heat, the original elastomer properties are regained.

The thermoplastic elastomer physical cross-links are therefore labile and may be rendered ineffective by processing techniques involving the application of heat. In this manner, the multilayer carriers may be hot formed at elevated temperature by conventional hot forming processes such as coextrusion, sequential extrusion or hot roll coating. The core layer 14 is integrally joined to the skin layers 16 and 18 during such processing by heat bonding or welding at the adjacent surfaces. However, if necessary, an elastomeric tie coat may be used.

The elastomer is preferably an A-B-A polymer wherein A represents a non-rubbery block which is glassy or crystalline at room or service temperature and B represents a rubbery block which is elastomeric at room or service temperature. Illustrative thermoplastic elastomers include elastomers formed of at least one copolymer selected from the group consisting of styrene-butadiene-styrene (SBS), styrene-isoprene-styrene (SIS) and styrene-ethylene-butylene-styrene (SEBS).

The thermoplastic elastomer may be blended with a thermoplastic film-forming polymer in order to modify its properties. In particular, the resulting blend will tend to be firmer and display a decreased compressibility as compared with the thermoplastic elastomer. Polyolefins such as polyethylene may be blended at weight proportions ranging up to 50%, and even 70% with the thermoplastic elastomer to provide variations in properties such as compressibility.

The skin layers 16 and 18 may be formed of any film-forming thermoplastic polymer which provides smoothing of the core surface and effectively separates the core layer 14 and adhesive layers 20 and 22. Suitable thermoplastic materials include various hydrocarbon polymers such as polyesters, polyurethanes, polyethylenes, polypropylenes, polyamides, and vinyls, and their blends, interpolymers and copolymers. Preferred materials include polyethylene and polypropylene.

The thermoplastic skin layer should preferably be relatively insoluble in and unaffected by the printing ink solvents. Preferably, the thermoplastic should have a melt temperature sufficiently close to that of the thermoplastic elastomer to enable coextrusion of the materials and formation of a permanent melt bond therebetween.

The thicknesses of the layers of the tape 10 are not critical, and they may be varied to provide a total tape thickness selected to meet printing requirements. Thus, the tape 10 may be provided in thicknesses of 10, 15 and 20 mils. In a 20 mil thick tape, the core 14 may have a thickness of 16 mils, and the skin layers 16, 18 and the adhesive layers 20, 22 each may be 1 mil thick.

Although the total thickness of the tape is not critical, uniform caliper should be maintained for a given tape thickness. Experience to date indicates that tape constructions in accordance with the invention may be provided with less than a 10% variation in thickness. Thus, a 20 mil thick tape may vary less than ±1 mil. Such thickness variation has been found acceptable for flexographic printing tape applications and to not yield a butt joint which is detectable in the printed product.

The core 14 comprises a thermoplastic elastomer as noted above. Presently, the preferred elastomers are SBS, SIS, SI, S(IS)$_x$ and SEBS block copolymers and mixtures thereof sold by the Shell Chemical Company under the designations Kraton D1102, D1107, D1111, D1112, D1117, D1125 and D4141 and Kraton G1650. These elastomers have hardness, Shore A values ranging from 32 to 75 and styrene/rubber ratios ranging from 14/86 to 29/71.

As indicated above, it is not necessary that one or both of the skin layers 16 and 18 be used in the absence of a need to prevent migration of the constituents of the adjacent layers. Further, it is not necessary that the skin layers 16 and 18 be of the same composition. In addition to providing a barrier and separation function, the skin layers should also be resistant to printing ink solvents. Examples of suitable skin layer materials include a low density polyethylene sold under the designation Dow LDPE 993 by Dow Chemical.

The adhesive layers 20 and 22 need not be of the same composition. The use of different adhesive compositions may be advantageous since the layers 20 and 22 generally will not be adhered to like materials in printing applications. However, it is often convenient to use the same adhesive for production purposes. The specific adhesive composition is not critical, and many acrylic and rubber based pressure-sensitive adhesives may be adapted for use herein. Suitable acrylic based adhesives are available from Avery Chemical and Ashland Chemical. Rubber based adhesives may be based on natural or synthetic rubbers. Synthetic rubber pressure-sensitive adhesives may be formulated using Kraton D and G series thermoplastic elastomers by Shell Chemical Company with the addition of tackifiers and other additives as is well known in the art.

Figure 2:
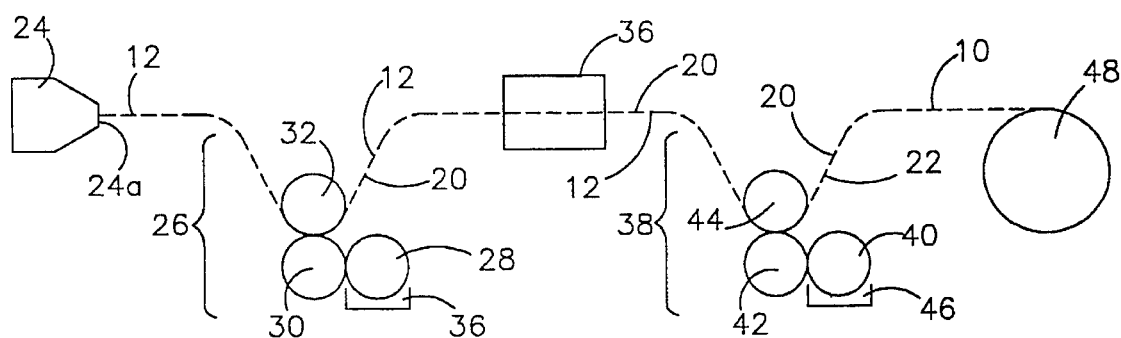
FIG. 2 illustrates certain steps in the manufacture of the tape as shown in FIG. 1.

Referring to FIG. 2, the multilayer carrier 12 may be prepared by coextrusion processing using a multifeed coextrusion ABA type die 24 having a die opening 24a corresponding with the dimensions of the coextruded core and skin layers. The die is supplied with skin and core charges by associated extruders (not shown). The shaped skin and core charges are joined just prior to exiting through die opening 24a in a known manner.

The core charge comprises a thermoplastic elastomer mixed with a blowing agent. For example, the elastomer may be Kraton D1112 which is a SIS block copolymer containing 60% SIS and 40% SI. A suitable physical blowing agent is sold under the designation Expancel® DU-091 by Casco Nobel AB of Sweden. The blowing agent is described as comprising a drop of liquid isobutane encapsulated by a gas-proof thermoplastic polymeric shell or microsphere. Upon heating, the shell is indicated to expand to more than 60 times its initial volume. The blowing agent is mixed with the elastomer at a concentration of 3% based on the weight of the elastomer. In addition, a plasticizer such as Shellflex® 371 oil may be added at a concentration of 3% based on the weight of the elastomer.

The skin charge may comprise a low density polyethylene such as the above mentioned Dow LDPE 993 by Dow Chemical.

The core and skin charges are heated and fed to the die 24 with little or no blowing and expanding of the blowing agent. The heating of the charges continues in the die 24 to a maximum or coextrusion temperature of about 160° C. for the above described materials. Substantially all of the expansion of the blowing agent is believed to occur just as the polymer begins to flow out of the opening of the die 24 and the pressure applied to the polymer is reduced. In this manner, the blowing agent effects on the core charge are minimal during the coextrusion processing thereof, since it is only at the exit from the extrusion die, e.g. within several inches of the die opening, that substantial expansion of the blowing agent occurs. If expansion of the blowing agent occurs earlier in the extrusion process, there is a tendency for the microspheres to blow out through the skin layers sometimes resulting in a very rough outer layer surface. Excessive pre-blowing can result in an effective loss of the cellular structure.

Prior to thermal blowing or expansion, the blowing agent effects on the charge and process may be likened to those resulting from the presence of an inert filler. Upon expansion or blowing of the agent as the extrusion exits from the die, the benefits of relatively larger size cells are obtained since the blowing agent may increase in size by an order of magnitude, i.e. 10 to 50 times larger or more.

The coextrudate emerging from the die 24 is contacted with a chill roll (not shown) in a conventional manner. This is believed to end substantially all blowing and expansion, and to fix the matrix and void structure of the core 14. The film may be contacted with further processing rolls in a conventional casting type coextrusion process.

The carrier 12 may be wound without a liner and stored for later processing following coextrusion and suitable cooling of the coextrudate since the skins 16,18 are typically non-blocking. The carrier 12 may thereafter be subsequently combined with suitable adhesive layers and release liners.

For convenience, a continuous production line is shown in FIG. 2. Following coextrusion, the carrier 12 is conveyed to a first adhesive coating station "A" for applying the adhesive layer 20 to the outside surface of the skin layer 16. A hot roll coater 26 is used to combine adhesive layer 20 with the carrier 12. The roll coater 26 includes as its major elements a casting roll 28 for delivering a coating of adhesive melt to a transfer roll 30 which cooperates with a back-up roll 32 to apply the adhesive to the surface of the skin layer 16. The adhesive melt is picked-up from a pan supply 34.

The adhesive layer 20 is cooled with suitable chill rolls (not shown) or other means, and the combined carrier 12 and layer 20 are inverted as they pass through a web turnover 36. The combined carrier 12 and layer 20 are conveyed to a second adhesive coating station "B" where adhesive layer 22 is applied to the outside surface of the skin layer 18 by a second roll coater 38 to complete the tape 10. As shown, the roll coater 38 includes a casting roll 40, transfer roll 42 and back-up roll 44 which cooperate to apply adhesive melt from adhesive pan supply 46 to the skin layer 18 to form the adhesive layer 22. The adhesive layer 22 is cooled with chill rolls (not shown) or other means, and the completed tape 10 is taken-up on roll 48 with the insertion of a suitable release liner to separate the wound adhesive layers. Typical release liners may comprise double coated, differential release liners or the use of two single coated release liners. The release liner may include a release coating or low adhesion coating, e.g. silicone, as are known in the art. Examples of such release coatings are set forth in U.S. Pat. No. 2,985,554.

The tape 10 may be manufactured in 54 inch wide rolls and subsequently slit to a more narrow width suitable for mounting flexographic printing plates. Such tape is typically slit to a 20 inch width or less. The 20 inch width corresponds with the width of many print cylinders. Thus, the printer or user of the tape may use a "right angle wrap" by winding the tape in its lengthwise or machine direction about the print cylinder circumference at a right angle to the cylinder axis or a "lengthwise wrap" by extending the tape in its lengthwise direction along the length of the print cylinder and wrapping the tape in its widthwise or cross machine direction about the print cylinder circumference. In the case of larger print cylinders, for example, 60 inch wide cylinders used in some packaging applications, a lengthwise wrap is customarily used. In all cases, a butt joint is formed at adjacent edges of the wrapped tape by initially overlapping the adjacent portions of the tape, cutting both plies of the overlapped tape with a single cut and stripping away the overlying tape portions to form a butt joint.

Figure 3:
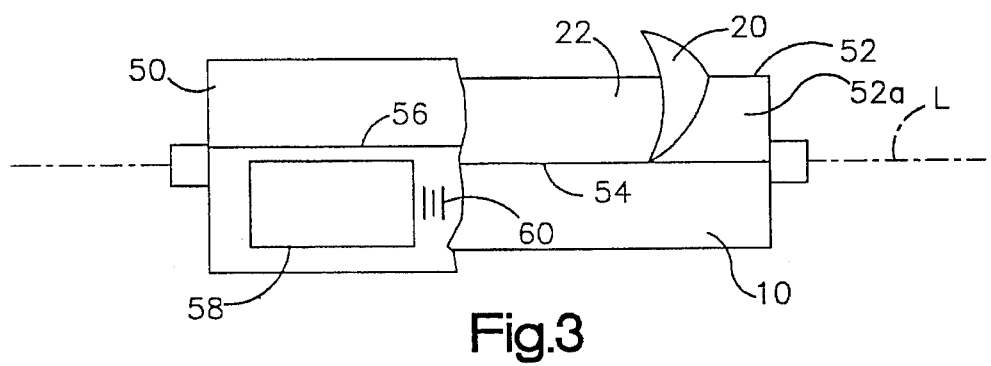
FIG. 3 is a fragmentary elevational view showing a printing cylinder having a flexographic printing plate mounted to it using the tape of FIG. 1, and having the tape pulled away from the right-hand end of the printing cylinder to show removability of the tape.

Referring to FIG. 3, the use of the tape 10 to mount a flexographic printing plate 50 to a print cylinder 52 is illustrated. The print cylinder 52 is of a size frequently used in label printing applications. It has a 20 inch width and a diameter of slightly less than about 3.5 inches. The tape adhesive must be sufficiently strong to hold the flexographic plate 50 tightly to the relatively small circumference of the print cylinder 52.

The print cylinder 52 is initially cleaned so that its steel cylinder surface 52a is free of printing ink, solvent and debris. The tape 10 together with its protective liner (not shown) should be sufficiently supple to allow it to be hand wrapped smoothly against the surface of the print cylinder without folds, bubbles or other non-conforming irregularities.

In this instance, a right angle wrap is used and the tape together with its associated release liner are cut to a length slightly greater than the circumference of the print cylinder 52. The exposed adhesive layer 20 of the tape 10 is pressed against the cylinder surface 52a and aligned with one of the cylinder edges to provide a right angle orientation with respect to the cylinder axis "L". If the tape installer is not satisfied with the alignment, the tape may be pulled from the cylinder surface 52a cleanly and without separation as shown at the right-hand edge of the cylinder, and repositioned. During such installation, the adhesive layer 22 is protected by the liner (not shown).

The lengthwise end portions of the tape overlap, and a single cut is made through the overlying portions to form a butt joint 54 which extends along the length of the print cylinder 52. As compared with prior art foam carrier tapes, the thermoplastic core 14 of the tape 10 is more easily cut to form a clean edge needed in a uniform butt joint. Often, prior art foam carrier tapes tear during cutting and leave ragged edges which do not form uniform joints.

The liner is then removed from the installed tape to expose the adhesive layer 22. The flexographic printing plate 50 is wrapped about the circumference of the cylinder and pressed against the adhesive layer 22 to tightly secure it to the cylinder surface 52a. The plate 50 is sized for use on a particular print cylinder and the ends of the plate are placed together to form a butt joint 56. The mounted printing plate 50 is now ready for printing operation.

During the printing operation, ink is applied by an inking roll (not shown) to the raised surfaces of the printing plate 50 corresponding with the indicia to be printed. The substrate to be printed is then resiliently contacted by the printing plate 50. The plate 50 includes both large indicia such as rectangle 58 having edge dimensions in the order of several inches and small indicia such as bar code 60 having an edge dimension of less than about several hundredths of an inch. The resilient characteristics of the contact with the substrate is provided in part or affected by the resiliency or compressibility of the tape 10. The tape 10 has a printing resiliency or compressibility intermediate that of prior art foam and resin film carrier tapes, and it therefore enables acceptable quality printing of both large and small indicia.

After the completion of the printing process, the printing plate 50 is separated from the adhesive layer 22 without tearing or internal layer-shearing of the latter. The tape 10 is then manually stripped from the print cylinder 52 without tearing or internal layer-shearing of the tape so as to leave the cylinder surface 52a free of tape residue.

In accordance with the invention, a tape was constructed having a multilayer coextruded carrier comprising a core layer charge of Kraton D1112, 3% Expancel® DU-091 and 3% Shelflex 371 oil. A polyethylene skin of Dow LDPE 993 was provided on each side of the core. A rubber based adhesive charge of the following formulation was prepared.

| | |
|---|---|
| Kraton D1102 (SBS) | 17% |
| Kraton D1117 (SIS) | 17% |
| Rosin ester tackifier | 45% |
| Mineral oil plasticizer | 10% |
| CaCO$_3$ | 10% |
| Antioxidant | 1% |

A layer of adhesive was applied to each skin layer of the carrier by hot roll coating as described above. The core layer was 16 mils thick and each of the other layers was 1 mil thick to provide a 20 mil thick tape. The thickness variation of the tape was less than ±1 mil. This tape is identified as Example 1 below and compared with an experimental tape and commercially available tapes having the constructions identified as Comparative Examples 1C through 5C hereinafter.

Comparative Example 1C comprises an experimental tape having a multilayer coextruded carrier including a core layer charge of Kraton D1125 which is SIS thermoplastic elastomer and a skin layer charge of thermoplastic polyurethane sold under the designation Pelethane by Dow Chemical. A skin was provided on each side of the core layer. As in Example 1, the core layer was 16 mils thick and each of the other layers was 1 mil thick to provide a 20 mil thick tape. This comparative example does not include a blowing agent, and the core and skin layers are substantially void free and continuous. Adhesive layers were applied to each face of the carrier using the same adhesive and processing as described above in Example 1.

Comparative Example 2C includes a 2.5 mil spun nonwoven central layer and opposed 7.5 mil foamed adhesive layers, one layer being an acrylic adhesive and the other being a rubber adhesive.

Comparative Example 3C is a four layer construction including a 3 mil polyvinylchloride central film layer secured by an acrylic adhesive to a 13 mil ethylvinyl acetate foam layer. Opposed outer adhesive layers are formed of acrylic and rubber adhesives respectively.

Comparative Example 4C includes an ethylvinyl acetate foam layer having polyethylene skins and opposed adhesive layers of acrylic and natural rubber.

Comparative Example 5C includes a 6.2 mil thick polyvinylchloride carrier film and opposed natural rubber based adhesive layers.

In accordance with the invention, the core layer 14 of the tape 10 provides both the desired tear resistance and compressibility. These properties are compared with the above described tapes.

The tear resistance of the central or core layer was measured for each of the above tapes using a modification of the test procedure of ASTM D 3574, Test F. In the case of relatively compressible tapes (e.g. tape 3C), such central or core layer is often formed of a cellular or otherwise compactable or collapsible construction, e.g. layer 14 of the tape 10. However, the central layer may be formed of a relatively continuous film material such as the polyvinylchloride film of tape 5C. In accordance with the test, the central layer is separated from the adjacent layers along a small portion of the tape length at one end thereof. The outer adhesive tape layers are adhered to masking tape strips having terminal ends extending beyond the ends of the separated tape layers and folded over to form gripper tabs. The tear strength of the central layer is measured by holding one of the masking tape gripper tabs stationary and pulling the other tab at an angle of about 180° and a speed of 12 inches per minute to cause or attempt to cause an internal tear failure in the central or core layer. The tear strength is reported for tapes having a tear-type failure in lbs./in. If the tape does not have a tear failure (e.g. masking tape or adhesive tape failed instead of the interior layer), then the test is reported as "n/a" since no relevant tear failure occurred.

The compressibility of a tape is indicated by the coefficient of compression ("COC") as measured using a modification of the test procedure of ASTM D3574, Test C. In this test, the tape is engaged by a weighted compression foot of a thickness gauge. Herein, a generally U-shape wire having a length of about one inch and a diameter of about 0.038 inches is placed between the compression foot and the core layer to better simulate the loads applied by the relatively small dimensions of the printing plate indicia of the flexographic printing plate. The tape thickness is measured with compression foot loads of 250, 500, 1000, 2500 and 4540 grams, and the percent thickness based on the 250 gram load is calculated as follows.

$$\text{Thickness Percent} = 100 \times \frac{(\text{thickness at weight} - 38)}{(\text{thickness at 250 grams} - 38)}$$

The thickness percent is plotted against the log of the applied weight, and the COC is equal to the absolute value of the slope of the curve. Thus, a relatively high COC value indicates a more compressible material.

TABLE I

| EXAMPLE NUMBER | NOMINAL THICKNESS[1] | TEAR STRENGTH[2] | COEFFICIENT OF COMPRESSION |
|---|---|---|---|
| 1 | 20 | n/a | 61 |
| 1C | 20 | n/a | 28 |
| 2C | 20 | 1.9 | 37 |

TABLE I-continued

| EXAMPLE NUMBER | NOMINAL THICKNESS[1] | TEAR STRENGTH[2] | COEFFICIENT OF COMPRESSION |
|---|---|---|---|
| 3C | 20 | 4.5 | 62 |
| 4C | 20 | 9.8 | 46 |
| 5C | 10 | n/a | 34 |

[1]mils
[2]lbs./inch

The tape in accordance with Example 1 has satisfactorily enabled printing of large and small indicia so as to indicate preferred printing compressibility, The tape of the present invention also has a relatively high cohesive or internal strength indicated by its high tear resistance so as to enhance its repositionability and one piece removability.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A double sided tape for detachably mounting a flexible printing plate to a printing press plate holder, said mounted printing plate being adapted to apply printing ink to a plurality of workpieces to be printed during printing operation, and to then be unmounted by detaching the printing plate from the holder, said tape comprising a hot formed multilayer carrier including a core layer formed of a thermoplastic elastomer matrix containing a substantially uniform distribution of voids generated by a blowing agent comprising thermally expandable microspheres and at least one skin layer formed of a film-forming thermoplastic polymer, said core layer having a void volume determined by the proportion of blowing agent in the core layer and by the degree of expansion thereof, said voids having a size substantially corresponding with the size of the expanded microspheres and being at least an order of magnitude larger than the microspheres of said blowing agent prior to expansion, said core layer having a compressibility and a tear strength which respectively accommodate compressive loads imposed during printing and tear or shear loads imposed during tape removal, said tape also including first and second pressure-sensitive adhesive layers respectively on opposed faces of said carrier, said tape being adapted to cause said printing plate during press operation to apply printing ink to a succession of workpieces to be printed at a degree of compression of said carrier which is substantially predetermined by the void volume of said core layer, and said core layer during tape removal providing sufficient tear strength to cleanly strip and separate said tape from said holder.

2. A method as in claim 1, wherein said thermoplastic elastomer matrix comprises an A-B-A, (A-B)$_x$A, or A-B block copolymer, or mixtures thereof, wherein A represents a non-rubbery block which is glassy or crystalline at room or service temperature and B represents a rubbery block which is elastomeric at room or service temperature.

3. A tape as in claim 2, wherein said thermoplastic elastomer is formed of at least one block copolymer selected from the group consisting of styrene-isoprene-styrene, styrene-ethylene-butylene-styrene and styrene-ethylene-butylene-styrene.

4. A tape as in claim 3, wherein said film-forming thermoplastic polymer is a member selected from the group consisting of polyethylene and polypropylene.

5. A tape as in claim 3, wherein said carrier has a coefficient of compressibility of about 61 and a Shore A hardness in the range of from about 25 to about 90.

6. A tape as in claim 3, wherein said carrier has a tear resistance in excess of the adhesion of the flexible printing plate to the printing plate holder.

7. A tape as in claim 3, wherein at least one of said pressure-sensitive adhesive layers is a repositionable adhesive.

8. A tape as in claim 3, wherein said pressure-sensitive adhesive layers are formed of an adhesive selected form the group consisting of acrylic based adhesive and rubber based adhesive.

9. A tape as in claim 8, wherein said first and second pressure-sensitive adhesive layers are formed of the same pressure-sensitive adhesive.

10. A method as in claim 3, wherein at least one of said pressure-sensitive adhesive layers is formed of a thermoplastic elastomer and a tackifier, and said skin layer prevents migration of said tackifier from said at least one adhesive layer to said core layer.

11. A tape as in claim 3, wherein said core layer is formed of a physical blend of said thermoplastic elastomer and a second film-forming thermoplastic polymer.

12. A tape as in claim 11, wherein said second thermoplastic polymer is a polyolefin which reduces the compressibility of the core.

13. A tape as in claim 3, wherein said thermoplastic polymer forming said skin layer is substantially free of voids and is resistant to printing ink solvent and said skin layer protects said core.

14. A tape as in claim 1, wherein said blowing agent microspheres include an expandable thermoplastic shell containing a liquid that is vaporized during expansion and substantially contained within the expanded thermoplastic shell.

15. A tape as in claim 1, wherein said carrier is hot formed at a forming temperature and said blowing agent has an expansion temperature selected to enable hot forming of said carrier with expansion of said blowing agent occurring at substantially the end of the carrier forming process without materially affecting the manipulative steps thereof.

16. A tape as in claim 15, wherein said voids have an average size of 27.8±5.9 microns.

17. A tape as in claim 15, wherein said voids range from about 11 microns to about 54 microns in size.

18. A tape as in claim 15, wherein said core has a void volume in the range of from about 10% to about 50%.

19. A tape as in claim 2, wherein said blowing agent microspheres include an expandable thermoplastic shell containing a liquid that is vaporized during expansion and substantially contained within the expanded thermoplastic shell, said voids range from about 11 to about 54 microns in size and said core has a void volume in the range of from about 10% to about 50%.

20. A double sided tape for detachably mounting a flexible printing plate to a printing press plate holder, said mounted printing plate being adapted to apply printing ink to a plurality of workpieces to be printed during printing operation and to then be unmounted by detaching the printing plate from the holder, said tape including a multilayer carrier comprising a coextrusion of a first charge of an elastomer containing a blowing agent comprising thermally expandable microspheres for forming a core layer and a second charge of a film-forming thermoplastic polymer for forming at least one skin layer, said carrier being coextruded at an extrusion temperature and said blowing agent having an expansion temperature selected to enable coextrusion of said carrier with expansion of said blowing agent occurring at substantially the end of the extruding process, without materially affecting the manipulative steps thereof, to provide said core as a matrix of said elastomer containing a substantially uniform distribution of voids formed by the expanded microspheres of said blowing agent, said tape also including first and second pressure-sensitive adhesive layers respectively on opposed faces of said carrier.

21. A tape according to claim 20, wherein said elastomer of said first charge is a thermoplastic elastomer, said core layer has a void volume determined by the proportion of blowing agent in the first charge and by the degree of expansion of the blowing agent, and said voids have a size substantially corresponding with the size of the expanded microspheres and being at least an order of magnitude larger than the microspheres of said blowing agent prior to expansion.

22. A tape according to claim 21, wherein said carrier is coextruded using a coextrusion die and said expansion temperature is selected to cause expansion of said blowing agent substantially as said carrier exits said die.

23. A tape according to claim 22, wherein said tape is adapted to cause said printing plate during press operation to apply printing ink to a succession of workpieces to be printed at a degree of compression of said carrier which is substantially predetermined by the void volume of said core layer, and said core layer during tape removal providing sufficient tear strength to cleanly strip and separate said tape from said holder.

24. A tape as in claim 22, wherein said voids range from about 11 microns to about 54 microns in size.

25. A tape as in claim 24, wherein said core has a void volume in the range of from about 10% to about 50%.

26. A tape as in claim 20, wherein said blowing agent microspheres include an expandable thermoplastic shell containing a liquid that is vaporized during expansion and substantially contained within the expanded thermoplastic shell, said voids range from about 11 to about 54 microns in size and said core has a void volume in the range of from about 10% to about 50%.

27. A tape according to claim 23, wherein said thermoplastic elastomer comprises an A-B-A, $(A-B)_xA$, or A-B block copolymer, or mixtures thereof, wherein A represents a non-rubbery block which is glassy or crystalline at room or service temperature and B represents a rubbery block which is elastomeric at room or service temperature.

28. A tape as in claim 27, wherein said thermoplastic elastomer is formed of at least one block copolymer selected from the group consisting of styrene-butadiene-styrene, styrene-isoprene-styrene, and styrene-ethylene-butylene-styrene.

* * * * *